United States Patent
Herron

(10) Patent No.: US 7,445,712 B2
(45) Date of Patent: Nov. 4, 2008

(54) ASYMMETRIC FORWARD OSMOSIS MEMBRANES

(75) Inventor: Jack Herron, Corvallis, OR (US)

(73) Assignee: Hydration Technologies Inc., Albany, OR (US)

( * ) Notice: Subject to any disclaimer, the term of this patent is extended or adjusted under 35 U.S.C. 154(b) by 479 days.

(21) Appl. No.: 11/101,691

(22) Filed: Apr. 7, 2005

(65) Prior Publication Data

US 2006/0226067 A1 Oct. 12, 2006

(51) Int. Cl.
*B01D 39/00* (2006.01)
*B01D 39/14* (2006.01)
*B01D 29/46* (2006.01)
*B01D 71/10* (2006.01)

(52) U.S. Cl. .................... 210/500.29; 210/500.27; 210/490; 264/41

(58) Field of Classification Search ............ 210/500.27, 210/490, 500.3, 500.31, 500.32, 483, 488, 210/50.32, 500.29; 264/41

See application file for complete search history.

(56) References Cited

U.S. PATENT DOCUMENTS

| | | | |
|---|---|---|---|
| 3,593,852 A * | 7/1971 | Meriwether ................ 210/490 |
| 3,894,166 A * | 7/1975 | Brown et al. ................ 427/316 |
| 4,214,994 A * | 7/1980 | Kitano et al. ............... 210/490 |
| 4,340,479 A * | 7/1982 | Pall ........................... 210/490 |
| 4,911,844 A * | 3/1990 | Linder et al. ................ 210/638 |
| 5,085,776 A * | 2/1992 | Blume et al. ........... 210/500.27 |
| 5,098,575 A * | 3/1992 | Yaeli .......................... 210/652 |
| 5,229,005 A * | 7/1993 | Fok et al. .................... 210/652 |
| 5,522,991 A * | 6/1996 | Tuccelli et al. .............. 210/490 |
| 6,354,444 B1 * | 3/2002 | Mahendran et al. ......... 210/490 |
| 6,908,553 B1 * | 6/2005 | Boggs et al. ................ 210/501 |
| 7,172,075 B1 * | 2/2007 | ji ............................... 210/490 |

* cited by examiner

*Primary Examiner*—Ana M Fortuna
(74) *Attorney, Agent, or Firm*—Jeffrey B. Oster

(57) ABSTRACT

There is disclosed a membrane formulation having high flux for forward osmosis applications. There is disclosed a forward osmosis filtration membrane having a salt rejection 99+% or greater, and comprising an asymmetric hydrophobic porous backing and cellulosic fibers. The membranes of the present invention find use in a variety of applications including osmotic-driven water purification and filtration, desalination of sea water, purification of contaminated aqueous waste streams, and the like. Specifically, there is disclosed a forward osmosis filtration membrane having a skin layer for salt rejection and a porous scaffold layer having a woven or non-woven mesh embedded within it.

14 Claims, 8 Drawing Sheets

ASYMMETRIC FORWARD OSMOSIS MEMBRANES

TECHNICAL FIELD OF THE INVENTION

The present invention provides a membrane formulation having high flux and useful for forward osmosis applications. The present invention provides a forward osmosis filtration membrane having a salt rejection 99+% or greater, and comprising an asymmetric porous backing and cellulosic fibers. The membranes of the present invention find use in a variety of applications including osmotic-driven water purification and filtration, desalination of sea water, purification of contaminated aqueous waste streams, and the like.

BACKGROUND OF THE INVENTION

Salt rejecting membranes for reverse osmosis applications have been prepared for more than 40 years. For example, U.S. Pat. No. 3,133,137 generally describes the preparation of cellulose based membranes for reverse osmosis by an immersion precipitation process. In this process, cellulose esters are dissolved in water soluble solvents then spread in a thin layer on a fabric backing. The fabric is immersed in water, causing the cellulosic plastic to precipitate from solution, forming a membrane bonded to the fabric. A drawing of a typical 1960's era casting machine is shown in FIG. 1. The structure of the membrane is termed "asymmetric" because the plastic solidifies with a thin, dense, surface layer (less than 10 microns in thickness) while the remainder of the cellulosic material solidifies to form a spongy microporous material. This structure is well suited for reverse osmosis (RO) because the flux through a membrane is inversely dependent on the thickness of the dense surface layer, while the microporous layer has little effect on the flux in RO applications. Fabric supports are required for mechanical strength since both the porous sublayer and thin surface layer have little resistance to tearing. In reverse osmosis however, the fabric supports cause only minor resistance to water flux.

The past 45 years of development of highly selective membranes has been focused primarily on the reverse osmosis process. Reverse osmosis is a pressure driven process. That is, once the osmotic pressure of the solution is overcome, the primary resistance to water flux through the membrane is hydrodynamic. This means the friction of water flowing through the pores of the membrane is the primary flow resistance. In RO membranes the flow resistance is almost entirely in the thin dense surface layer, ("rejection layer") and the microporous support layer and fabric backing have a minor or insignificant resistance.

Forward osmosis, by contrast, is a diffusion driven process instead of pressure driven process, so the factors affecting water flux are dramatically different than reverse osmosis. Because of this, a high performance forward osmosis membrane requires a dramatically different structure than RO membranes. The present invention was made to address this need for forward osmosis membranes.

SUMMARY OF THE INVENTION

The present invention provides such a supported porous membrane, in particular a skinned forward osmosis membrane, that exhibits the beneficial (for forward osmosis applications) of a high titer reduction, low resistance to diffusion, lack of defects, and good structural integrity. The present invention also provides a method for preparing such a membrane.

Specifically, in a first embodiment, the present invention provides an asymmetric forward osmosis membrane having three layers comprising:

(a) a skin layer made from polymeric material having a top surface as a rejection surface of the asymmetric forward osmosis membrane, and a bottom surface, wherein the density of the skin layer is greater than 50% polymer (by volume);

(b) a porous scaffold layer bonded to the bottom surface of the skin layer, wherein the scaffold layer is made from the same polymeric material as the skin layer and wherein the density of the scaffold layer is from about 15% to about 30% (by volume); and (c) a hydrophilic woven or nonwoven porous fabric bonded to the second surface of the scaffold layer.

Preferably, the skin layer has an average thickness of from about 8 to about 18 microns. Preferably, the scaffold layer has an average thickness of from about 25 to about 75 microns. Preferably, the polymeric skin layer and porous scaffold layer material is selected from the group consisting of cellulose acetate, cellulose triacetate, cellulose proprianate, cellulose butyrate, cellulose acetate propionate, cellulose diacetate, cellulose dibutyrate, cellulose tributyrate, and combinations thereof. Preferably, the hydrophilic porous fabric is selected from the group consisting of cotton, non-woven cellulose polyolefin blends (Kimberly Clark), EVA (ethylene vinyl acetate) nonwoven cloths and screens, nonwoven polyester-polyolefin composites, nonwoven acrylic composites, and extruded hydrophilic microporous membrane sheets having average pores greater than 0.1 microns (e.g., polycarbonate dialysis membranes, or extruded polyethylene silica membranes).

Specifically, in a second embodiment, the present invention provides an asymmetric forward osmosis membrane having two layers comprising:

(a) a skin layer made from polymeric material having a top surface as a rejection surface of the asymmetric forward osmosis membrane, and a bottom surface, wherein the density of the skin layer is greater than 50% polymer (by volume);

(b) a porous scaffold layer bonded to the bottom surface of the skin layer, wherein the scaffold layer is made from the same polymeric material as the skin layer and wherein the density of the scaffold layer is from about 15% to about 30% (by volume); and (c) a mesh or nonwoven fabric having greater than 50% open area embedded within the porous scaffold layer.

Preferably, the skin layer has an average thickness of from about 8 to about 18 microns. Preferably, the scaffold has an average thickness of from about 75 to about 150 microns. Preferably, the mesh is a woven monofilament mesh. Most preferably, the mesh or nonwoven fabric is selected from the group consisting of polyester woven screens, polypropylene woven screens, woven acrylics woven nylon screens, and combinations thereof. Preferably, the polymeric membrane material is selected from the group consisting of cellulose acetate, cellulose triacetate, cellulose acetate proprianate, cellulose butyrate, cellulose acetate propionate, cellulose diacetate, cellulose dibutyrate, cellulose tributyrate, and combinations thereof.

The present invention further provides an immersion/precipitation process for making a supported forward osmosis membrane comprising:

(a) applying a casting solution slurry of polymeric material in a solvent onto a surface of a rotating drum to form a casting solution layer, wherein the casting solution comprises from about 70% to about 90% (by volume) of a solvent formulation and from about 10% to about 30% (by volume) of a polymeric solid material;

(b) pulling a non-woven fabric or woven mesh support material having at least about 50% open area into the casting solution slurry on the surface of the rotating drum so that the support material is fully embedded within the casting solution slurry; and (c) immersing the casting solution-imbedded support material into a water bath, whereby the casting solution-imbedded support material coagulates the polymeric material into a supported forward osmosis membrane.

Preferably, the non-woven fabric is selected from the group consisting of polyester, polypropylene, polyolefin blends polyester-polyolefin composites, and nylon. Preferably, the woven mesh is selected from the group consisting of polyester woven screens, polypropylene woven screens, woven acrylics, woven nylon screens, and combinations thereof. Preferably, the polymeric membrane material is selected from the group consisting of cellulose acetate, cellulose triacetate, cellulose proprianate, cellulose butyrate, cellulose acetyl propionate, cellulose diacetate, cellulose dibutyrate, cellulose tributyrate, and combinations thereof. Preferably, the solvent formulation comprises ketones, organic acids and a short chain alcohol.

BRIEF DESCRIPTION OF THE DRAWINGS

FIG. 3 differs from the RO-style techniques of FIG. 1 in that the casting polymer slurry is first layered onto the surface of the rotating drum and then the fabric is immersed into the layer of slurry to become integrated within of the porous sublayer rather than just a layer on a surface. The second method for producing an FO membrane used an innovative casting technique to imbed the casting polymer into a monofilament polyester mesh.

DETAILED DESCRIPTION OF THE INVENTION

Figure 1:
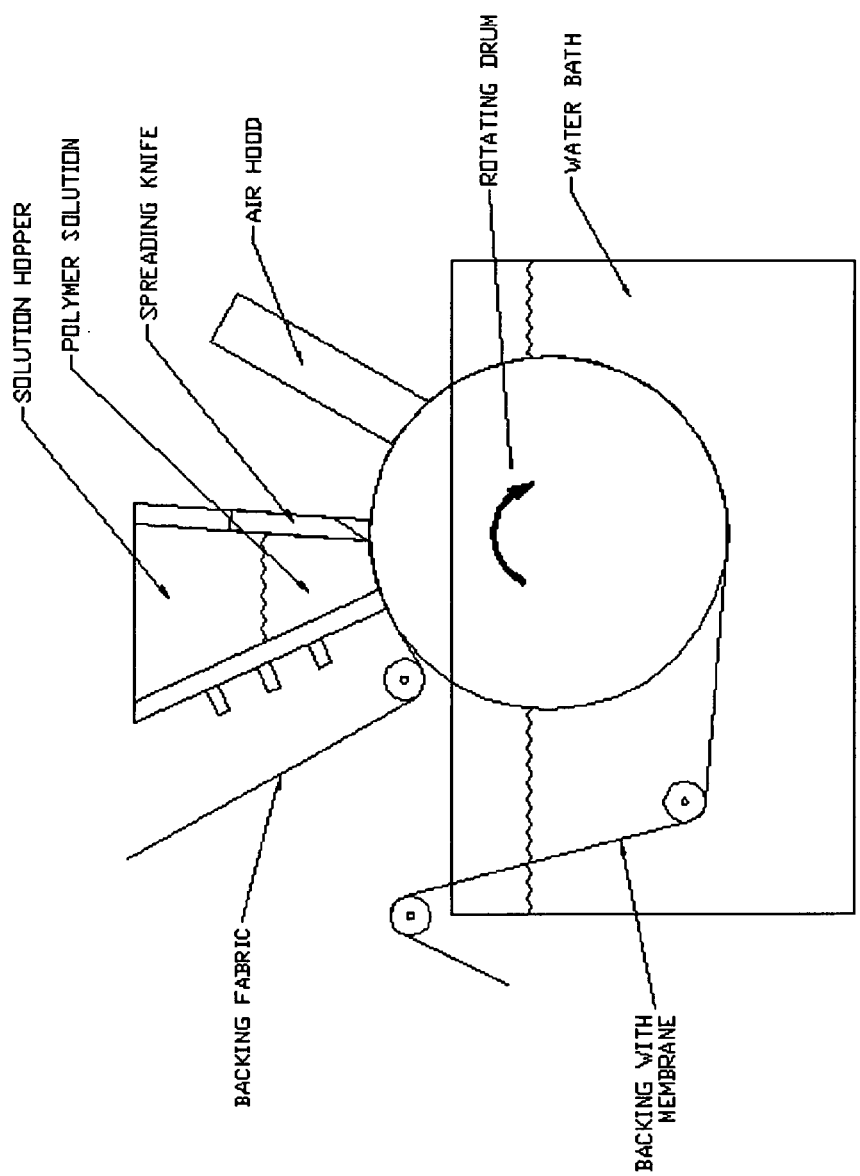
FIG. 1 shows an old style membrane casting scheme. Specifically, the polymer solution is added to the surface of a support fabric. This membrane is useful for RO (reverse osmosis) applications as it will be relatively resistant to compaction in the high hydraulic pressure systems typical of RO.
Figure 2:
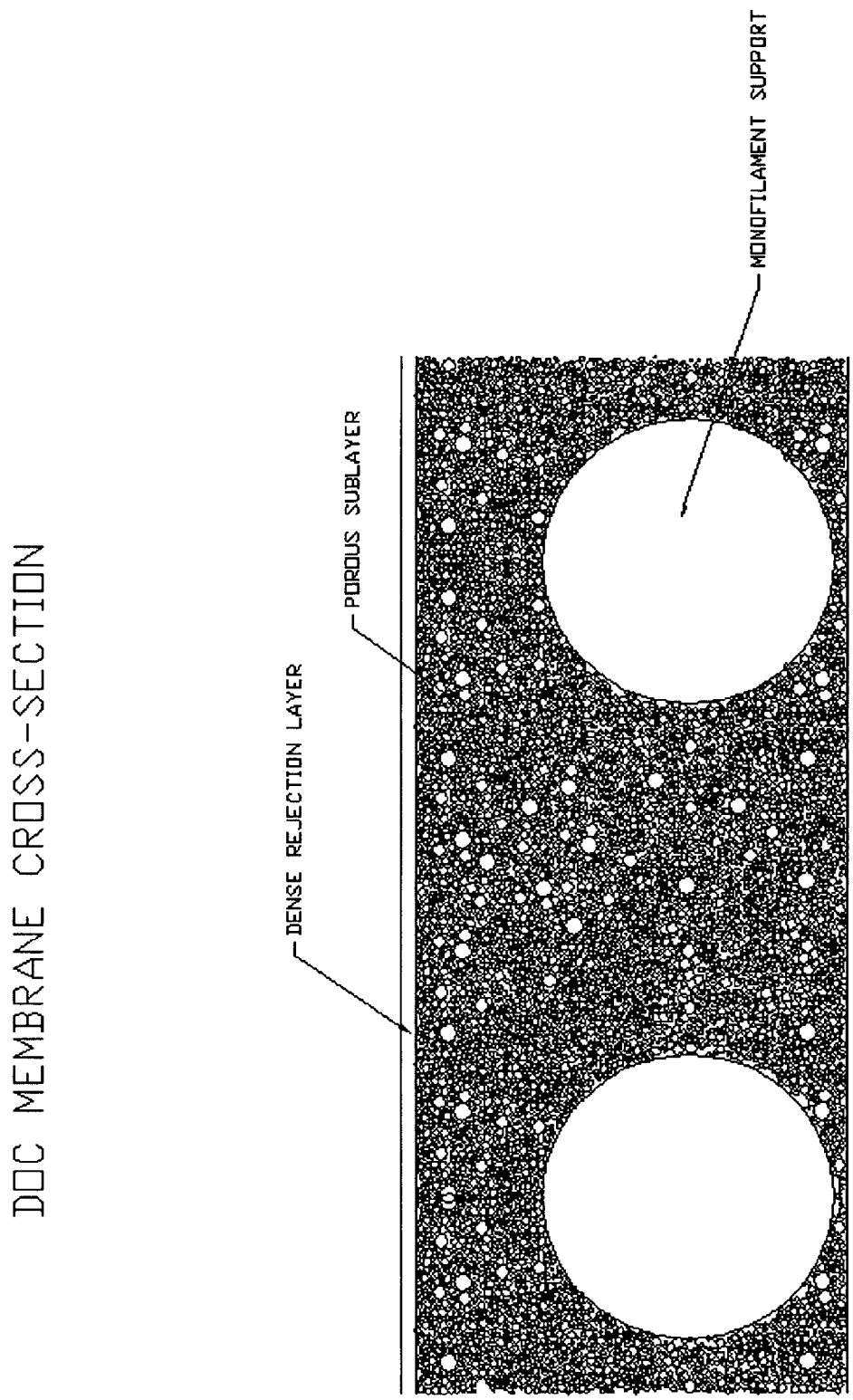
FIG. 2 shows a cross section of the inventive membrane made with a hydrophilic nonwoven cellulose and polypropylene fabric. The fabric was 400 microns in thickness and had a 50 micron membrane layer (shin plus porous sublayer). The cellulose content of the fabric made it highly hydrophilic.

The present invention provides two different iterations of the inventive membrane. In the first iteration a hydrophilic fabric backing material was used in a three-layered membrane. The second iteration of the inventive membrane has an open backing material, preferably a polyester mesh, having greater than 50% open area in a two layered membrane wherein the mesh support material is embedded within a porous support layer of membrane polymeric material.

The architecture of the first embodiment of the inventive membrane comprises three elements, specifically a backing element layer of a nonwoven cloth or woven mesh. The middle section is called a porous scaffold or a sublayer, while the surface is called the rejection or skin layer. The architecture of the second embodiment of the inventive membrane has the backing element layer immersed within the porous scaffold or porous sublayer to form a two layered asymmetric membrane.

Each layer of the inventive membrane provides different properties to optimize forward osmosis (FO) performance in different FO types of applications. For example, the skin layer (in both embodiments) is the site of rejection of salts, microbiological agents, biological molecules or other solid materials. The skin layer is preferably about 10 microns (micrometers) thick.

The scaffold layer is preferably of the same polymer material as the skin (as both are formed together) and is typically about 100 microns thick and is highly porous, basically a scaffold. The scaffold layer and skin layer are formed by slow gelation during casting. Briefly, casting a membrane involves a solution of membrane solids and solvent extruded over a drum to spread the solution out, wherein the drum is turning to allow even distribution of a thin layer of the polymer solution or slurry (solids suspended within a solvent). The solution is either applied to a fabric or it is first applied to a rotating drum and a support mesh or fabric is embedded into the solution or slurry. The membrane-forming material then rotates with the drum into a water bath to gel to form the membrane as a continuous process. Preferably, the polymeric slurry solution contains from about 10% to about 30% (by volume) solids. Preferably, the solvents solution is a mixture of the following solvents acetone, methanol, ethanol, glycerol, methyl ethyl ketone, dioxane and other similar solvents.

The thickness and rejection properties of the skin layer can be adjusted with an air knife. The air knife forms a denser skin surface ("skin") by raising the surface concentration of polymer (by evaporating off some solvent). The skin actually forms when the polymer contacts the water because water makes the polymer solution unstable. The skin layer forms within the first few millimeters in the water bath, but the porous sublayer gels much more slowly since water must penetrate the skin layer to make the polymer gel. Since the solution is 70% to 90% solvent the polymer gels in a spongy microporous structure.

The newly-formed membrane will cure in the water bath. Preferably, the water bath is at or below room temperature, and most preferably the water bath temperature is from about 0° C. to about 30° C. During the curing process, the newly formed membrane is continually in contact with a roller and the roller surface is in contact with either the fabric or mesh backing material (first embodiment) or second side of the porous scaffold layer having a mesh backing material contained within (second embodiment). This arrangement to have a roller maintain contact with the second side of the backing material prevents a second skin from forming in the second embodiment.

Next, a rinse (water) bath rinses out residual solvents. This is preferably followed by an anneal bath (at approximately 50-60° C.) to allow a relaxation of polymer stress points to form a more uniform membrane. Without being bound by theory, the anneal bath provides for the polymeric material to loosen up its tertiary structure by essentially melting and reforming the hydrogen bonding of the cellulosic polymeric material by a melting and re-annealing.

The last step is to extract out the water from the membrane and replace with an emmolient, such a glycerin, ethylene glycol (for non-food application) or any water soluble solvent that does not dissolve the membrane (e.g., higher molecular weight alcohols).

A FO (forward osmosis) membrane differs significantly from an RO (reverse osmosis) membrane in the structural integrity and in the nature of the porous sub-layer. With regards to structural integrity, an RO membrane has to be able to withstand significant greater pressures because hydraulic pressure is the driving force that drives water through the membrane through a forward pushing. FO, by contrast, uses osmotic pressure to pull water through the membrane. Moreover, in an RO system, the skin provides the key to the barrier properties with the rest of the membrane used for structural support so that the pressures will not blow the membrane apart. In FO, by contrast, there is a diffusion of solids through the highly porous backing layer and porous sublayer. This means that the physical nature of the backing layer and the middle porous sublayer are just as important for the characteristics of the inventive membrane as the skin layer. The present invention provides a backing and porous sublayer to have as little resistance as possible to solids diffusion or water transport. Moreover, the inventive FO membranes are a "soft" membrane that does not have to resist compaction like an RO membrane (due to the high pressures pushed against the membrane in RO processes). This means that an RO membrane will work poorly in a FO process (FIG. 6) and the inventive FO membranes will not work as well in an RO process (FIG. 7).

Immersion/Precipitation Process

The immersion/precipitation process for making the inventive FO membranes provides first dissolving the membrane polymeric material in a water-soluble solvent (non-aqueous) system. Appropriate water-soluble solvent systems for cellulosic membranes include, for example, ketones (e.g., acetone, methyl ethyl ketone and 1,4-dioxane). Included in the water-soluble solvent systems are pore-forming agents (e.g., malic acid, citric acid, lactic acid and lithium chloride) and strengthening agents (e.g., agents to improve pliability and reduce brittleness, such as methanol, glycerol and ethanol). The membrane polymeric material is dissolved in the water-soluble solvent system to form a solution. In the first embodiment, the solution is then extruded onto a surface of a hydrophilic backing material. Preferably, an air-knife is used to evaporate some of the solvent to prepare the solution for formation of the skin layer. The backing material with solution extruded on it is then introduced into a coagulation bath (e.g., water bath). The water bath causes the membrane components to coagulate and form the appropriate membrane characteristics (e.g., porosity, hydrophilic nature, asymmetric nature).

Typically, for the present invention (first embodiment) the membrane has an overall thickness from about 25 micrometers to about 150 micrometers (excluding the backing material). The backing materials typically have a thickness of from about 50 micrometers to about 500 micrometers in thickness.

In the second embodiment the solution is cast onto a rotating drum and an open fabric is pulled into the solution so that the fabric is embedded into the solution. The solution is then passed under the air knife and into the coagulation bath.

Typically, the membrane in the second embodiment has an overall thickness of 75 to 150 microns and the support fabric has a thickness from 50 to 100 microns. The support fabric preferably has over 50% open area.

The immersion/precipitation process forms an asymmetric membrane with a solid skin layer as a surface component, having about 5-15 micrometers in thickness. There is also a scaffold layer composed of the same polymeric material, wherein the scaffold layer is highly porous and allows diffusion of solids within the porous scaffold layer. The scaffold layer is created by the immersion/precipitation process and its porosity controlled by both the casting parameters and by the choices of solvent and ratio of solids of polymeric material to solvent solution.

For the second embodiment FO membrane, polymer is extruded into the holes of the mesh backing. In an FO process of the first embodiment FO membrane, water transport occurs through the holes of the mesh backing layer as the mesh backing fibers do not offer significant lateral resistance (that is, the mesh backing does not significantly impede water getting to surface of membrane). The porous scaffold layer has a density of polymer as low as possible, preferably from about 15-30% polymer by volume. Preferably 20-25% polymer by volume. The top skin layer is 8-20 microns thick with a density of greater than 50% polymer. The FO process proceeds with an absorption/desorbtion process with water dissolving into the polymer material. However, salts and other solids do not dissolve into the polymeric material. This is in contract to RO membranes, even RO membranes made with similar polymeric materials because the sublayers of RO membranes needs to have resistance to compaction and be mechanically sound. The RO process then forces salts and other solids into any sublayers.

In the one comparison of the second embodiment FO membrane (that is having a woven porous polyester backing material of about 100 strands per $cm^2$, fiber thickness was about 200-300 microns in diameter, 55-60% open area), two membranes were made, one cast according to the present invention having a woven polyester backing and the same (polymeric material) membrane cast without a backing material. Flux rates of both membranes were compared with the same solutions. The inventive backed FO membrane had faster flux rates. This result is counter-intuitive. Without being bound by theory, it appears that the stresses caused by the backing provided fissures in the porous scaffold sublayer, or an increase of skin outer surface layer or both.

In RO membranes, rejection is inverse to flux rates. In the inventive FO membranes however, when the osmotic agent is contacted on the skin side of the membrane and a water source with low dissolved solid content is contacted on the backing side, flux can actually increase with increasing rejection. This is because any osmotic agent that passes through the membrane gets trapped in the backing layer and decreases the osmotic driving force.

The following examples are mixtures of casting solutions used for the casting of inventive FO membranes (percentages are by volume):

| Mix 1 | |
|---|---|
| CA (cellulose acetate) | 13.9% |
| 1,4 Dioxane | 53.2% |
| Acetone | 18.4% |
| Methanol | 8.2% |
| Lactic Acid | 6.3% |
| Mix 2 | |
| CTA (cellulose triaceatate) | 13.8% |
| 1,4 Dioxane | 57.8% |
| Acetone | 19.8% |
| Methanol | 8.6% |
| Mix 3 | |
| CAP (cellulose acetyl propionate) | 13.8% |
| 1,4 Dioxane | 53.3% |
| Acetone | 18.3% |
| Methanol | 7.9% |
| Lactic acid | 6.7% |
| Mix 4 | |
| CA | 6.7% |
| CTA | 6.7% |
| 1,4 Dioxane | 53.2% |
| Acetone | 18.4% |
| Methanol | 8.2% |
| Lactic Acid | 6.8% |
| Mix 5 | |
| CA | 12.5% |
| CAB (cellulose acetyl butyrate) | 1.4% |
| 1,4 Dioxane | 53.2% |
| Acetone | 18.4% |
| Methanol | 8.2% |
| Lactic Acid | 6.3% |
| Mix 6 | |
| CTA | 12.5% |
| CAB | 1.4% |
| 1,4 Dioxane | 53.2% |
| Acetone | 18.4% |
| Methanol | 8.2% |
| Lactic Acid | 6.3% |
| Mix 7 | |
| CTA | 13.1% |
| 1,4 Dioxane | 52.5% |
| Acetone | 19.7% |
| Methanol | 8.2% |
| Lactic acid | 6.6% |
| Mix 8 | |
| CA | 12.9% |
| 1,4 Dioxane | 55.2% |
| Acetone | 20.5% |

| -continued | |
|---|---|
| Methanol | 7.2% |
| Lactic Acid | 4.2% |
| Mix 9 | |
| CTA | 6.7% |
| CAP | 6.7% |
| 1,4 Dioxane | 49.5% |
| Acetone | 22.3% |
| Methanol | 8.2% |
| Lactic Acid | 6.6% |
| Mix 10 | |
| CA | 6.5% |
| CTA | 6.5% |
| 1,4 Dioxane | 62.2% |
| Acetone | 11.2% |
| Methanol | 7.7% |
| Lactic acid | 5.9% |

In each of the ten mixtures listed above, a "higher-performance" FO inventive membrane was created that has a salt rejection property of 95+% in an RO rejection test. Optimal preferred properties for the first iteration of a membrane were found using a woven polyester backing having greater than 50% open area. The casting solution was extruded and partially evaporated with an air knife, gelled and annealed in a water bath at a temperature of at least 50° C.

Differences between Forward and Reverse Osmosis Membranes

In FO a diffusion path from the rejection layer through the porous sublayer and backing must exist and be as short and unobstructed as possible. Any material in this diffusion path needs to hydrophilic and porous. As a result, thin film composite RO membranes make very poor FO membranes. This is because the polysulfone microporous support layer of these membranes does not absorb water, forming a barrier to water transport. Cellulosic RO membranes are also poor in FO since they are typically cast on hydrophobic polyester backings. These are excellent supports for RO due to their high mechanical strength, however in FO they form a diffusion barrier.

Cellulosic membranes for reverse osmosis have had the casting conditions, polymer content and solvent mixtures optimized to give high water flux while resisting pressure induced collapse of the porous sublayer. Cellulosic membranes for FO have little applied pressure and require different polymers, solutions and casting conditions.

Two FO Membranes

An inventive FO membrane of the first embodiment was cast on a wet-laid, nonwoven cellulose polypropylene blend hydrophilic backing (Hollingsworth and Vose) instead of the dense polyester used in RO applications. The backing was 400 microns in thickness and had a 50 micron membrane layer. The cellulose content of the backing made it highly hydrophilic.

Figure 3:
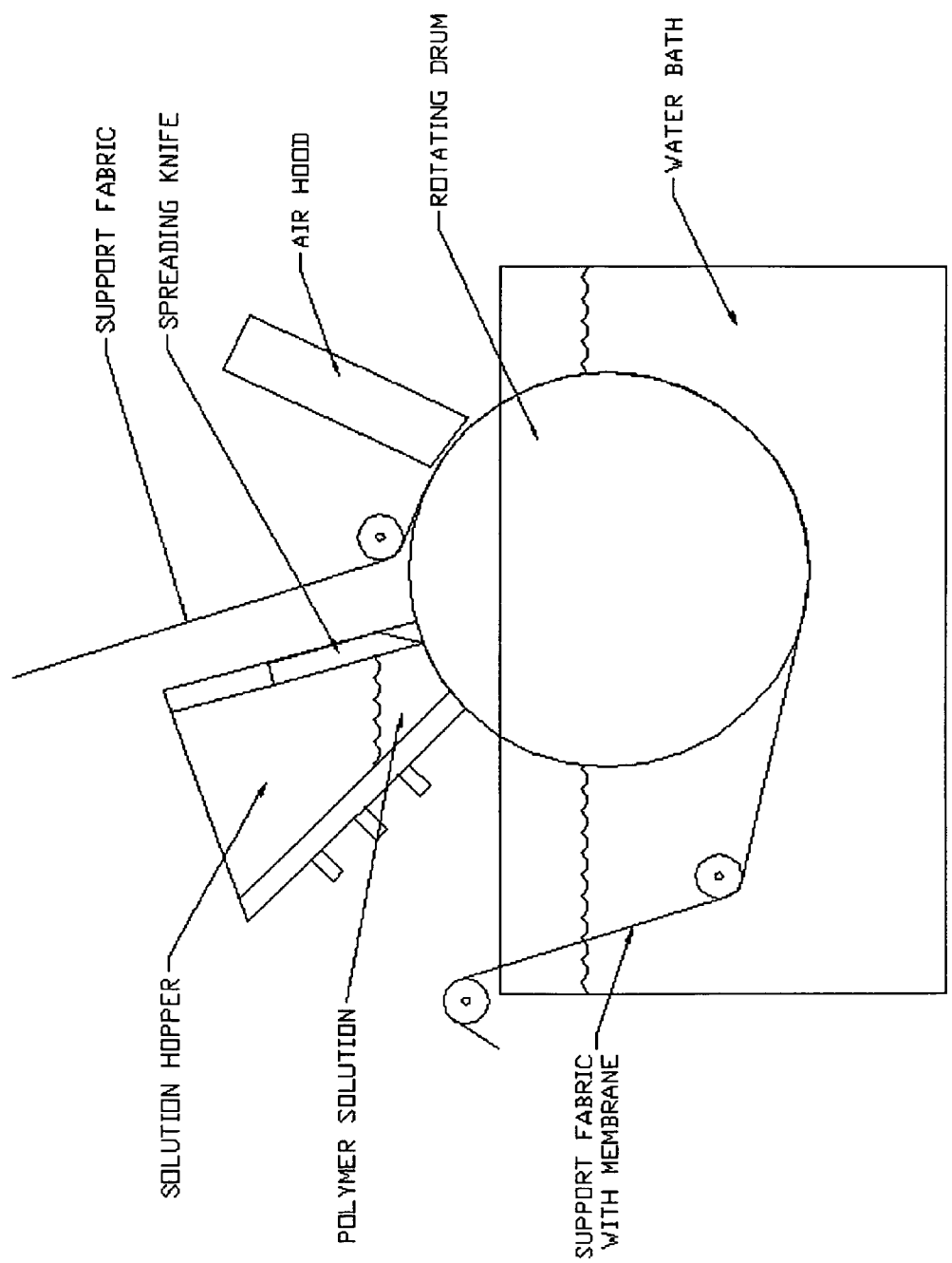
FIG. 3 shows equipment schematics for the inventive membrane casting. The casting technique involved spreading the polymer solution in a thin layer onto the casting drum then pulling the mesh into the solution layer.
Figure 4:
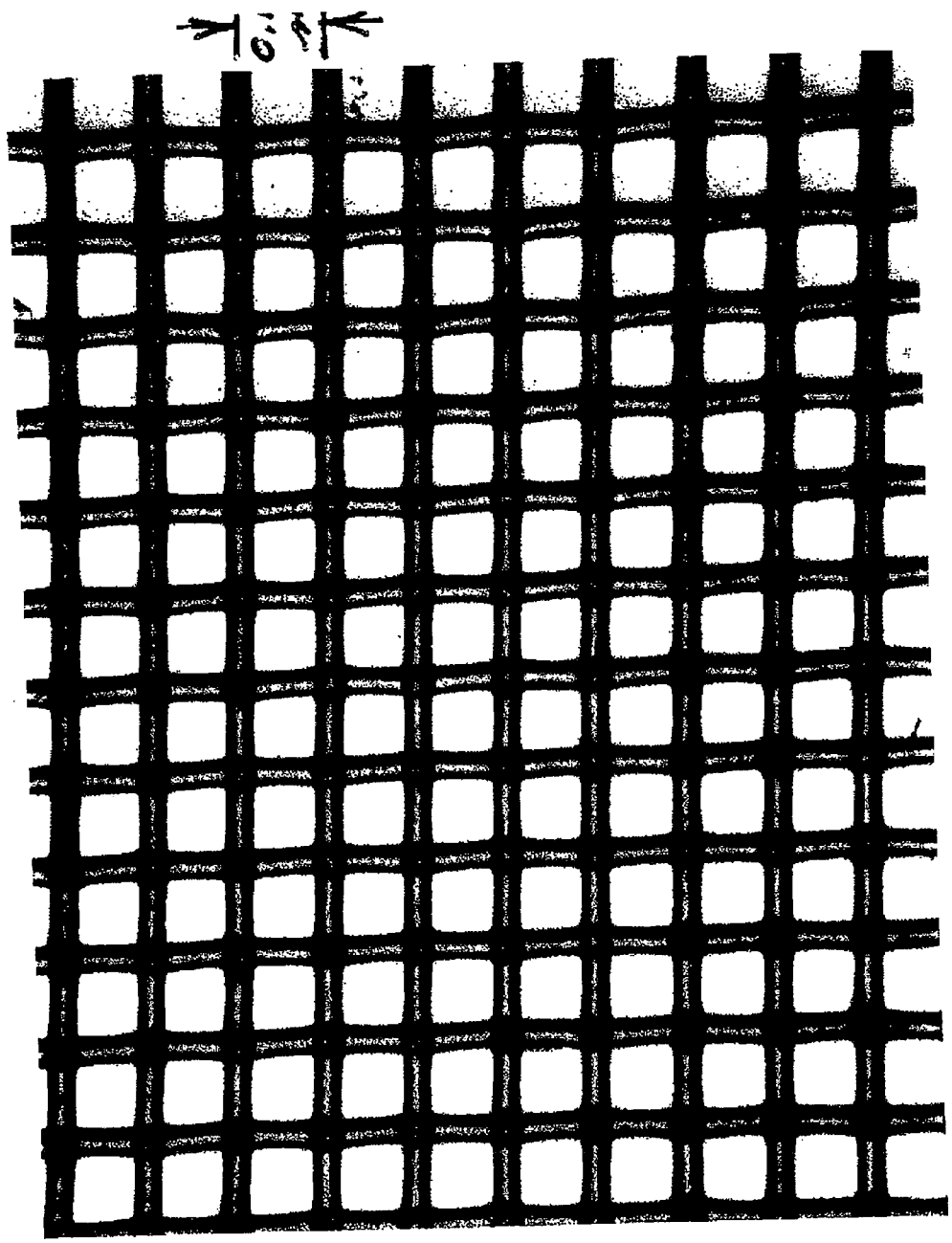
FIG. 4 shows a photograph of the inventive membrane having a woven fabric (the grid-like pattern) made with the equipment of FIG. 3. The fabric mesh was 60 microns thick with 55% open area.

A second inventive FO membrane was made using an innovative casting technique to imbed the casting polymer into a monofilament polyester mesh (i.e., second embodiment). The mesh was 60 microns thick with 55% open area. The casting technique involved spreading the polymer solution in a thin layer onto the casting drum then pulling the mesh into the solution layer. A drawing of the innovative equipment is shown in FIG. 3. This technique was developed because the usual method of applying the polymer onto the surface of the fabric left numerous air bubbles in the membrane (FIG. 4).

Figure 5:
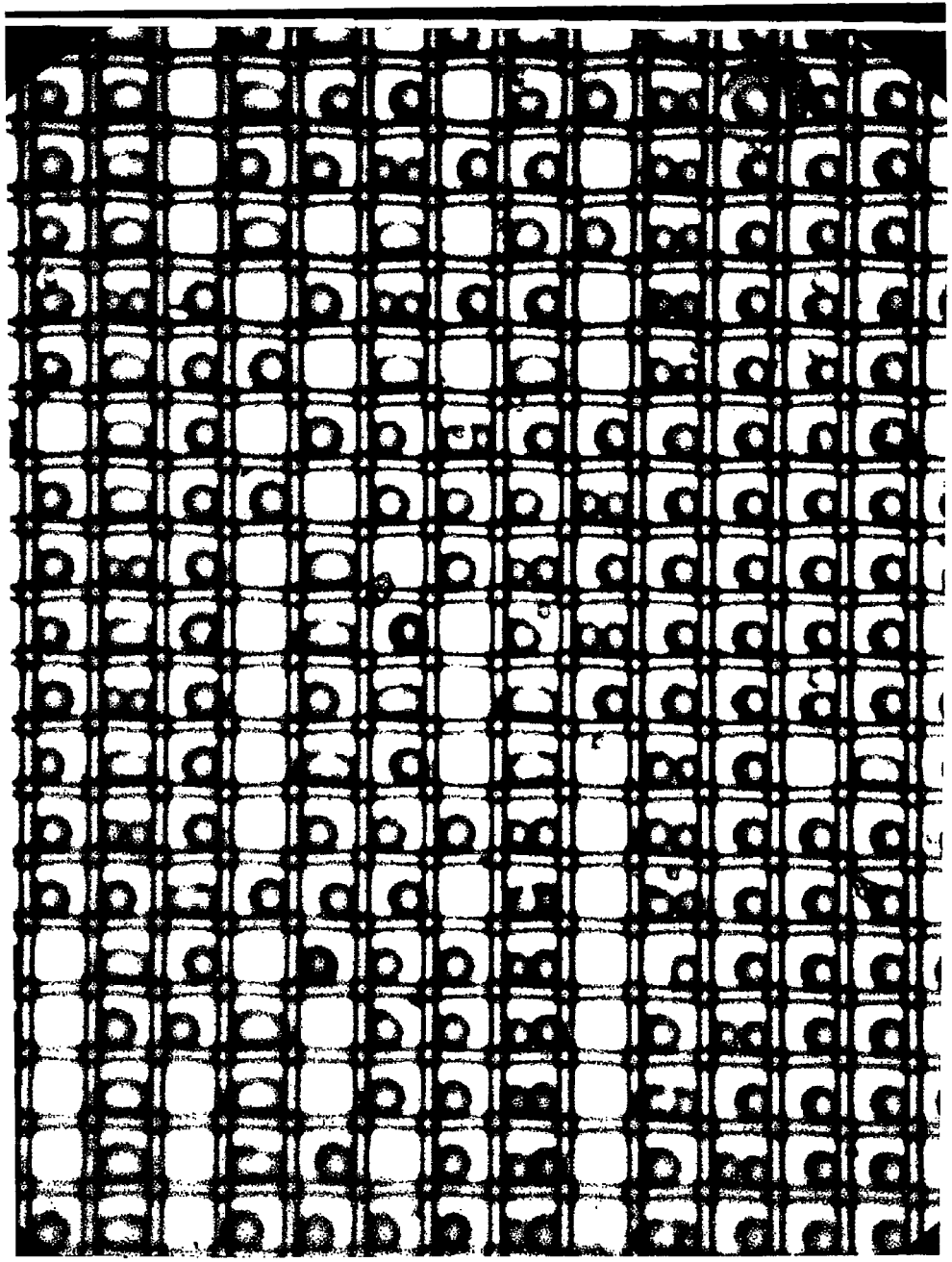
FIG. 5 shows a similar photograph of a woven fabric backed RO membrane made with equipment for RO membranes of FIG. 1. Note the large amount of irregular air bubbles present.

Photos of the membranes produced by casting in the inventive manner (FIG. 4) and in the traditional manner (FIG. 5) are shown.

Comparative Testing of Membranes

Figure 6:
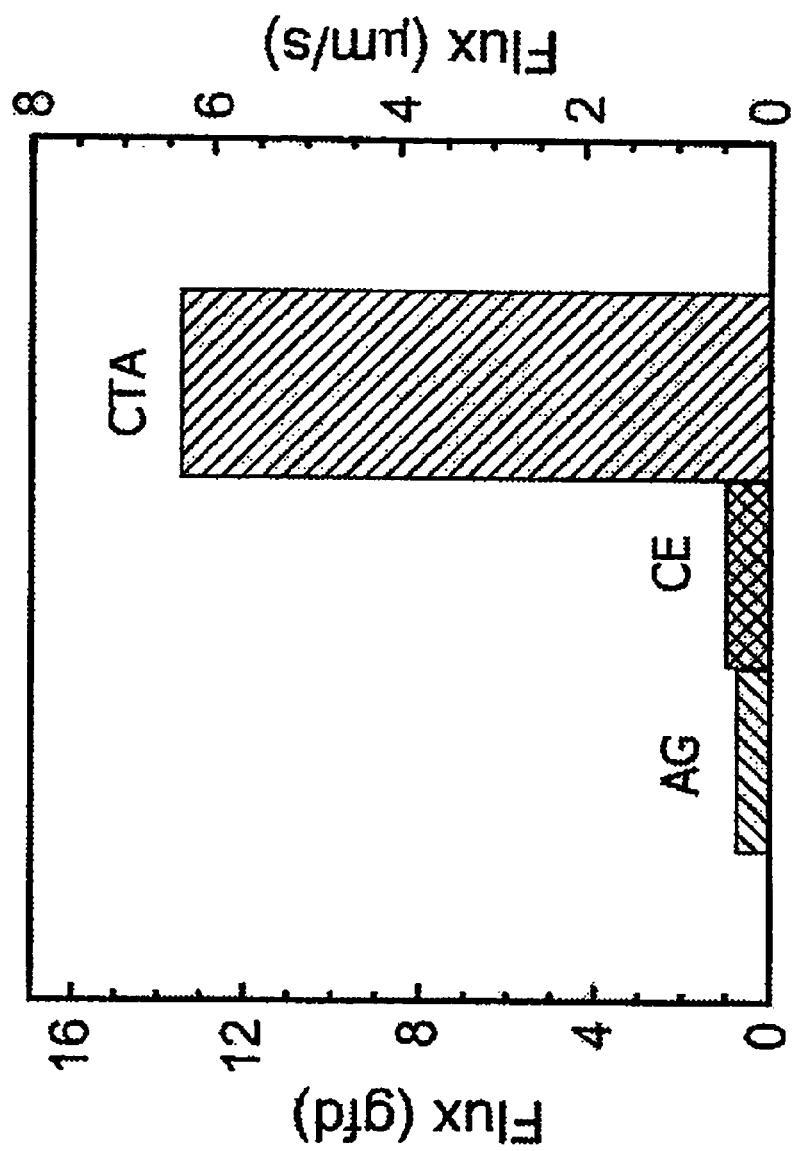
FIG. 6 shows a comparison of flux rates for three different asymmetric membranes in a test for performance under FO or forward osmosis conditions. AG is a thin film composite RO membrane (Osmonics, now GE Water Systems), CE is a cellulose ester blend RO membrane (Osmonics, now GE Water Systems), and CTA is a membrane produced according to the second embodiment of this invention. FO performance conditions measured water flux rates under forward osmosis conditions (6M ammonium bicarbonate draw solution, 0.5M sodium chloride feed solution and temperatures of both feed and draw solutions of 50° C. The data show that the inventive membrane had a far superior flux rate than either RO membrane under FO conditions.
Figure 7:
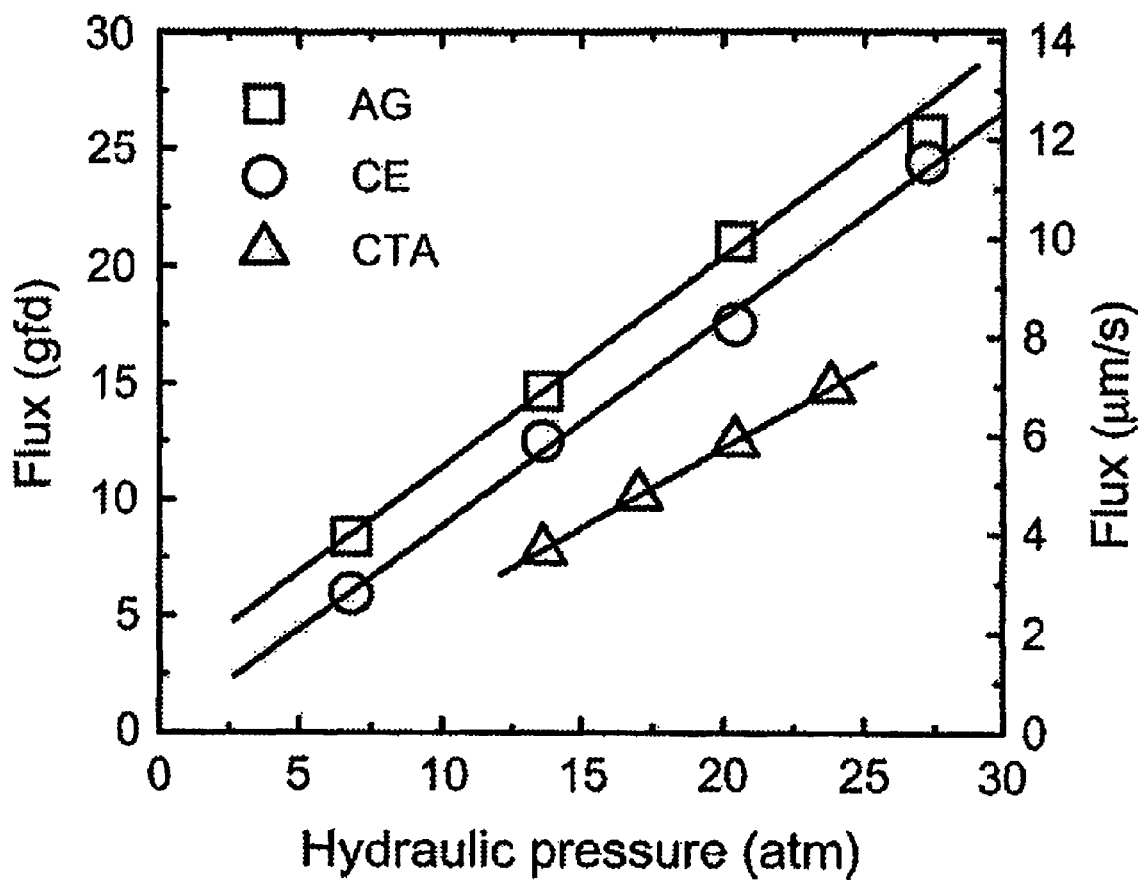
FIG. 7 shows a comparison of flux rates for three different asymmetric membranes in a test for performance under RO or reverse osmosis conditions. The same membranes as were used in FIG. 6 were again used for this RO test. The data show that the inventive membrane had a fair but lower performance for RO than the standard RO membranes under RO conditions with hydraulic pressure up to 30 atm. Pure water flux of deionized water was measured at 25° C.

FIG. 6 shows a comparison of flux rates for three different asymmetric membranes in a test for performance under FO or forward osmosis conditions. AG is a thin film composite RO membrane (Osmonics, now GE Water Systems). CE is a cellulose ester blend RO membrane (Osmonics, now GE Water Systems), and CTA is was the inventive membrane produced according to the second embodiment. FO performance conditions measured water flux rates under forward osmosis conditions (6M ammonium bicarbonate draw solution, 0.5M sodium chloride feed solution and temperatures of both feed and draw solutions of 50° C. The data show that the inventive membrane had a far superior flux rate than either RO membrane under FO conditions.

FIG. 7 shows a comparison of flux rates for three different asymmetric membranes in a test for performance under RO or reverse osmosis conditions. The same membranes as were used in FIG. 6 were again used for this RO test. The data show that the inventive membrane had a fair but lower performance for RO than the standard RO membranes under RO conditions with hydraulic pressure up to 30 atm. Pure water flux of deionized water was measured at 25° C.

Figure 8:
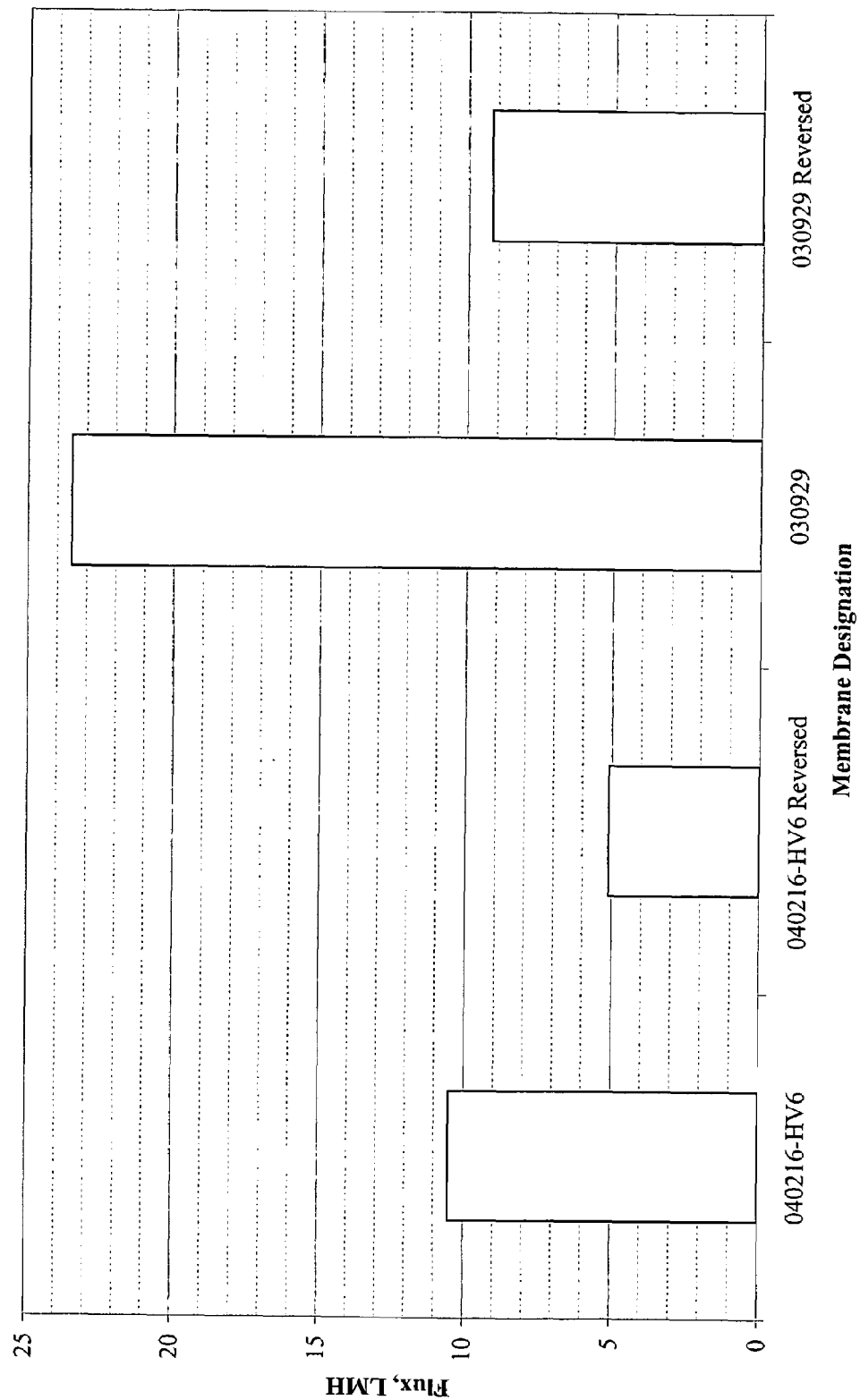
FIG. 8 shows a comparison of flux rates of two different inventive membranes. In one instance, each of two membranes is "reversed" meaning that the flux is in a reverse direction through the membrane. "HV6" designates the Hollingsworth and Vose nonwoven material used as a backing nonwoven fabric. The "030929" designation refers to the second embodiment inventive FO membrane. "Reversed" refers to the backing side communicating with the osmotic agent. The higher flux results were achieved without a "reversed" style of membrane.

A comparison of the flux through the embedded membrane and the membrane cast on the hydrophilic nonwoven backing are shown in FIG. 8. In this comparison, a 50% dextrose solution is flowed across one side of the membrane and tap water is flowed on the other. All results are normalized to 20° C. In FIG. 8, "HV6" designates the Hollingsworth and Vose nonwoven material as the backing material in an inventive membrane embodiment. The "030929" designation refers to the inventive second embodiment inventive FO membrane. "Reversed" means that the backing side communicates with the osmotic agent such that the flux of water from the water side on the skin to the osmotic agent, or what is normally the reverse of the flux direction. The higher flux results were achieved without a "reversed" style of configuration.

I claim:

1. An asymmetric forward osmosis membrane having three layers comprising:
   (a) a skin layer made from polymeric material having a top surface as a rejection surface of the asymmetric forward osmosis membrane, and a bottom surface, wherein the density of the skin layer is greater than 50% polymer by volume, and wherein the skin layer has an average thickness of from about 8 to about 18 microns;
   (b) a porous scaffold layer having a first surface bonded to the bottom surface of the skin layer and a second surface, wherein the scaffold layer is made from the same polymeric material as the skin layer and wherein the density of the scaffold layer is from about 15% to about 30% by volume, and wherein the scaffold layer has an average thickness of from about 25 to about 75 microns; and
   (c) a hydrophilic support fabric.

2. The asymmetric forward osmosis membrane of claim 1, wherein the polymeric membrane material is selected from the group consisting of cellulose acetate, cellulose triacetate, cellulose proprianate, cellulose butyrate, cellulose acetyl propionate, cellulose diacetate, cellulose dibutyrate, cellulose tributyrate, and combinations thereof.

3. The asymmetric forward osmosis membrane of claim 1, wherein the fabric support is selected from the group consisting of cotton, non-woven cellulose polyolefin blends, EVA (ethylene vinyl acetate) nonwoven cloths and screens, non-woven polyester-polyolefin composites, nonwoven acrylic composites, and extruded hydrophilic porous membrane sheets having average pores greater than 0.1 microns.

4. An asymmetric forward osmosis membrane having three layers comprising:
   (a) a skin layer made from polymeric material having a top surface as a rejection surface of the asymmetric forward osmosis membrane, and a bottom surface, wherein the density of the skin layer is greater than 50% polymer by volume;
   (b) a microporous scaffold layer having a first surface bonded to the bottom surface of the skin layer and a second surface, wherein the scaffold layer is made from the same polymeric material as the skin layer and wherein the density of the scaffold layer is from about 15% to about 30% polymer by volume; and
   (c) a support fabric having greater than 50% open area embedded in the scaffold layer.

5. The asymmetric forward osmosis membrane of claim 4, wherein the skin layer has an average thickness of from about 8 to about 18 microns.

6. The asymmetric forward osmosis membrane of claim 4, wherein the scaffold has an average thickness of from about 75 to about 150 microns.

7. The asymmetric forward osmosis membrane of claim 4, wherein the support fabric is a monofilament mesh.

8. The asymmetric forward osmosis membrane of claim 7, wherein the woven mesh is selected from the group consisting of polyester woven screens, polypropylene woven screens, woven acrylics woven nylon screens, and combinations thereof.

9. The asymmetric forward osmosis membrane of claim 4, wherein the polymeric membrane material is selected from the group consisting of cellulose acetate, cellulose triacetate, cellulose acetate proprianate, cellulose butyrate, cellulose acetyl propionate, cellulose diacetate, cellulose dibutyrate, cellulose tributyrate, and combinations thereof.

10. An immersion/precipitation process for making preparing a supported forward osmosis filtration membrane comprising:
    (a) providing a porous nonwoven or woven support material having greater than 50% open area;
    (b) applying a casting solution slurry onto a rotating drum to form a casting solution layer having a substantially uniform surface, wherein the casting solution comprises from about 70% to about 90% (by volume) of a solvent formulation and from about 10% to about 30% (by volume) of a polymeric solid material; and
    (c) embedding the support fabric into the layer of casting solution by pulling the support into the layer;
    (d) forming a skin layer with an air knife; and
    (e) immersing the casting solution into a water bath to coagulate the polymeric material into a FO membrane backed with the support material.

11. The immersion/precipitation process for making preparing a supported forward osmosis filtration membrane of claim 10, wherein the support fabric is selected from the group consisting of cotton, non-woven cellulose polyolefin blends, EVA (ethylene vinyl acetate) nonwoven cloths and screens, nonwoven polyester-polyolefin composites, nonwoven acrylic composites, and extruded hydrophilic porous membrane sheets having average pores greater than 0.1 microns.

12. The immersion/precipitation process for making preparing a supported forward osmosis filtration membrane of claim 10, wherein the woven mesh is selected from the group consisting of polyester woven screens, polypropylene woven screens, woven acrylics woven nylon screens, and combinations thereof.

13. The immersion/precipitation process for making preparing a supported forward osmosis filtration membrane of claim 10, wherein the polymeric membrane material is selected from the group consisting of cellulose acetate, cellulose triacetate, cellulose proprianate, cellulose butyrate, cellulose acetyl propionate, cellulose diacetate, cellulose dibutyrate, cellulose tributyrate, and combinations thereof.

14. The immersion/precipitation process for making preparing a supported forward osmosis filtration membrane of claim 10, wherein the solvent formulation comprises a ketone, a dioxane and a short chain alcohol.

* * * * *